United States Patent [19]

Nakamura

[11] 4,228,881
[45] Oct. 21, 1980

[54] CLUTCH RELEASE DEVICE OF THE SELF-CENTERING TYPE USING A PLASTIC DEFORMATION MEMBER

[75] Inventor: Takeshi Nakamura, Hiratsuka, Japan

[73] Assignee: Nippon Seiko Kabushiki Kaisha, Tokyo, Japan

[21] Appl. No.: 829,575

[22] Filed: Aug. 31, 1977

[30] Foreign Application Priority Data

Sep. 14, 1976 [JP] Japan .................................. 51-109451

[51] Int. Cl.$^2$ ........................ F16D 23/14; F16C 19/00
[52] U.S. Cl. ..................................... 192/98; 308/233
[58] Field of Search ............... 192/98, 110 B; 308/233

[56] References Cited

U.S. PATENT DOCUMENTS

| | | | |
|---|---|---|---|
| 3,416,637 | 12/1968 | Maurice | 192/98 |
| 3,625,327 | 12/1971 | Birdsey | 192/98 |
| 3,882,979 | 5/1975 | Limbacher | 192/98 |
| 3,900,091 | 8/1975 | Maucher | 192/98 |
| 3,921,775 | 11/1975 | Matyschick | 192/98 |
| 4,013,327 | 3/1977 | Kunkel et al. | 192/98 |
| 4,026,398 | 5/1977 | Matyschick et al. | 192/98 |
| 4,080,019 | 3/1978 | Flaissier et al. | 198/98 |

FOREIGN PATENT DOCUMENTS 7422616  1/1975  France .......................................... 192/98

*Primary Examiner*—Allan D. Herrmann
*Attorney, Agent, or Firm*—Shapiro and Shapiro

[57] ABSTRACT

A clutch release device of the self-centering type comprises a clutch release bearing means for releasing a clutch, and bearing support means slidably mounted on the front cover of transmission means for supporting and guiding the bearing means. The bearing means is formed for movement in a direction perpendicular to the rotational axis of the fly-wheel of the clutch. A plastic deformation member of visco-elasticity is disposed between the bearing means and the bearing support means. The plastic deformation member is deformed by the motion of the bearing means perpendicular to the rotational axis which results from a centripetal force acting on the bearing means during clutch release when there is an eccentricity between the rotational axis of the flywheel and the center line of the bearing means, thus permitting movement of the bearing means to its aligned position, so that the plastic deformation member is plastically deformed into the aligned position and holds the bearing means at that position.

19 Claims, 5 Drawing Figures

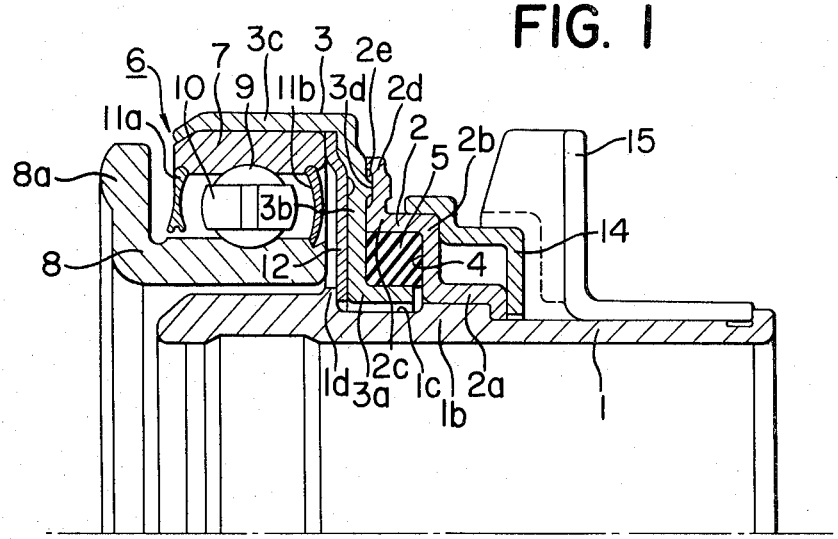

CLUTCH RELEASE DEVICE OF THE SELF-CENTERING TYPE USING A PLASTIC DEFORMATION MEMBER

BACKGROUND OF THE INVENTION

1. Field of the Invention

This invention relates to a clutch release device, and more particularly to a clutch release bearing means of the self-centering type.

2. Description of the Prior Art

Generally, the clutch release device of this type has a clutch release bearing provided for a sleeve mounted for axial sliding movement on a front cover projectedly provided on a transmission means. Either the inner race or the outer race of the bearing is rotatable and the race which is rotatable is caused to bear against a torque transmitting member such as diaphragm spring or pawl of the clutch device to thereby create the release action of the clutch.

However, it is extremely difficult in manufacture and assembly to precisely align the axis of the clutch release bearing with the rotational axis of the fly-wheel. This misalignment is a parallel deviation (eccentricity) between the rotational axis of the fly-wheel and the center line of the bearing of the clutch release device.

This causes abnormal slip of the surface of contact between the torque transmitting member of the clutch device and the clutch release bearing, which slip in turn leads to wear of this contact portion and production of unpleasant abnormal noise or vibration, and further to heaviness of the clutch operation. This is becoming a more and more serious problem today in view of the tendency of automobiles toward higher speeds.

For this reason, there has already been proposed a device in U.S. Pat. No. 3,416,637, in which the clutch release bearing means is mounted with a clearance so as to be movable in a direction perpendicular to the axis of the sleeve and the bearing means is displaced so that the center thereof is aligned with the rotational axis of the fly-wheel by a centripetal force acting on the clutch release bearing means when rotating in contact with the diaphragm, thus fixing the clutch release bearing means with respect to the sleeve at the displaced position by the friction force resulting from the spring force, namely, holding the bearing means at its aligned position by the spring force. However, the conventional device of this type is disadvantageous in that it is apt to produce fretting or creep and when the aforementioned deviation is relatively small, perfect alignment or centering is difficult to obtain.

The conventional device of this type has a further disadvantage that when it is subjected to a shock load after alignment, eccentricity is apt to occur over the full extent of a predetermined clearance.

There has also been proposed a device in U.S. Pat. No. 3,625,327 in which an elastic member is inserted between the clutch release bearing means and the sleeve so that the bearing means is freely displaceable to its aligned position. In this case however, the aligning operation must take place for each clutch release and this not only leads to poor durability of the device but also produces vibration each time the aligning or self-centering operation takes place, and results in serious wear of the diaphragm.

SUMMARY OF THE INVENTION

It is therefore an object of the present invention to provide a clutch release bearing means of the self-centering type which is simple in construction and easy to assemble and which may be held at its aligned position by a single self-centering operation and ensures the alignment even for a very small extent of eccentricity for which self-centering could not heretofore been accomplished.

To achieve these objects, the present invention takes advantage of the permanent strain, especially, the permanent compressive strain, which can be usually minimized in elastic materials such as rubber, synthetic resin polymers, etc., and utilizes this property of such elastic materials by increasing the permanent compressive strain thereof. More specifically, according to the present invention, a plastic deformation member having visco-elasticity which is readily plastically deformable in a short time by a load resulting from a centripetal force is interposed at a suitable location between a clutch release bearing and a sleeve supporting it, so that in the presence of deviation (eccentricity) between the rotational axis of the fly-wheel and the bearing center line of the clutch release device and when a centripetal force is exerted on the bearing during the use of the clutch, the plastic deformation member is deformed during the clutch release to align the clutch release bearing means and by this aligning action, the plastic deformation member is plastically deformed at one time or gradually, thereby holding the clutch release bearing means to its aligned position.

Further, even if the deviation (eccentricity) of the bearing center line with respect to the rotational axis of the fly-wheel is extremely small, the alignment takes place for each clutch release until the bearing means is held at its aligned position by the plastic deformation of the plastic deformation member, whereby the plastic deformation is gradually accumulated.

A suitable plastic deformation member used with the present invention may be synthetic resin polymer having visco-elasticity which is readily deformable by a load such as pressure force or the like, synthetic rubber which is low in bridge or cross linking density, or synthetic rubber which is in false bridged condition, and any of these materials may be put into use after being shaped into a configuration which is ready to take the aforementioned centripetal force.

Usually, synthetic rubber is provided by mixing and batching a raw material called raw rubber, a reinforcing filler for improving the elasticity, elongation, tensile strength, etc. of the raw material (for example, carbon black, calcium silicate or the like), an extender (reaction product of vegetable oil and sulfur, known as factice), various additives and vulcanizing agent (polysulfide), thereafter heating and vulcanizing the mixture to thereby form highly dense bridges of rubber molecules, thus forming a rubber material having elasticity.

Unlike these common rubber materials, a very suitable material for the present invention is a plastic deformation member of visco-elasticity having a composition in which the reinforcing agent is decreased while the extender is increased, or a plastic deformation member of visco-elasticity having the same composition as said composition but in which a thermoplastic polymer such as vinyl chloride having the same function as the extender is added, shaped and vulcanized to thereby reduce the bridge density of rubber molecules, or a plastic deformation member of visco-elasticity in which unvulcanized silicon raw rubber, for example, dimethylsilicon raw rubber, is mixed with ester borate as bridging agent, fumed silica as extender, and plasticizer, thereby making false bridge. Also suitable is a plastic deformation member in which the bridge density is reduced by an unvulcanized material composed of chlorinated polyethylene mixed with the same reinforcing agent and extender as those used with synthetic rubber, or by a slight amount of vulcanizer.

It is further preferable to add minute solid material such as glass fiber, pulp fiber or powdered iron in order to improve the plastic deformation member having any of the above-mentioned compositions so as to have the best suitable property for such usage, namely, the property of being less deformable for a shock load but readily plastically deformable for a load gradually applied.

Such a plastic deformation member of visco-elasticity, if sheathed with common synthetic rubber, would be perfectly reusable even if a great eccentricity should again occur as during the repair of the automobile.

Table 1 below shows the relations required between the ambient temperature and the load when samples A, B, C and D are compressed by 2 mm in the diametrical direction thereof, these samples being preferred examples of the plastic deformation member usable with the present invention and having been obtained by mixing 30% of vinyl chloride with nitrile rubber, vulcanizing the mixture for six, eight, ten and twelve minutes, respectively, thereafter shaping the vulcanized materials into a cross-sectional diameter of 5.5 mm and a length of 50 mm.

TABLE 1

| Sample | Temperature | | |
|---|---|---|---|
| | 24° C. | 80° C. | 150° C. |
| A | 14.8 Kg | 6.8 Kg | 2.3 Kg |
| B | 17.0 Kg | 7.2 Kg | 2.6 Kg |
| C | 17.7 Kg | 7.0 Kg | 2.6 Kg |
| D | 18.8 Kg | 8.0 Kg | 2.8 Kg |

On the other hand, the permanent compressive strain test carried out on the basis of JISK 6301 shows that a 100% compressive strain is obtained under the test conditions of 120° C. and 72 hours (that is, the righting moment is zero for the strain imparted). Incidentally, the permanent compressive strain of common rubber under the same conditions is of the order of 10 to 20%.

The temperature exerted on the bearing during the use of the clutch release device is usually of the order of 80° C., and the centripetal force exerted on the bearing during the use of the clutch release device and in the presence of a deviation (eccentricity) of about 0.6 to about 0.8 mm between the rotational axis of the fly-wheel and the center line of the bearing is of the order of 6 to 8 Kg. Therefore, it will readily be appreciated that the foregoing visco-elastic member is readily deformable by such centripetal force and moreover, most of the deformed portion is plastically deformed in the form of permanent compressive strain.

The invention will become more fully apparent from the following detailed description thereof taken in conjunction with the accompanying drawings.

BRIEF DESCRIPTION OF THE DRAWINGS

FIG. 1 is a vertical cross-sectional view of a first embodiment of the present invention.

FIGS. 2 to 5 are views schematically showing some specific examples of the invention used in the effect measuring test.

DESCRIPTION OF THE PREFERRED EMBODIMENTS

Reference is first had to FIG. 1 to describe an embodiment of the present invention in which a plastic deformation member of visco-elasticity as described above is interposed between a clutch release bearing and a sleeve supporting this bearing.

The sleeve 1 of the clutch release device is loosely fitted for axial sliding movement on a front cover (not shown) projectedly provided on the casing of transmission means. A circumferential projected portion 1b formed substantially in the lengthwise center of the sleeve 1 has a bearing supporting cover 2 formed integrally therewith. The supporting cover 2 has a first portion 2b radially extending from a base 2a joined with the sleeve 1, a cylindrical portion 2c axially extending from the first portion toward a fly-wheel, and a second portion 2d extending from the left end of the cylindrical portion. The sleeve 1 has a circumferential groove 1c formed therein in parallel relationship with the cylindrical portion 2c of the cover 2, and a bearing case 3 is provided which has a cylindrical base 3a opposed to the circumferential groove 1c. The bearing case 3 has a radially extending portion 3b and a portion 3c cylindrically extending from the outer peripheral end of the portion 3b toward the fly-wheel. The inside diameter of the base 3a of the bearing case 3 is made somewhat larger than the outside diameter of the circumferential groove 1c of the sleeve 1 so as to define a clearance therebetween so that the bearing case 3 is radially movable by an amount corresponding to the clearance. In an annular chamber 4 defined by and between the cover 2 and the bearing case 3, a ring 5 of the aforementioned plastic deformation member of visco-elasticity is forced into between the base 3a of the bearing case 3 and the cylindrical portion 2c of the cover 2.

A recess 2e is formed on the portion of the second radially extending portion 2d of the cover 2 which faces the bearing case 3, and the recess is engaged by a projection 3d provided in the radially extending portion 3b of the bearing case 3, thereby preventing the creeping of a bearing 6 due to relative rotation between the bearing case 3 and the bearing support cover 2.

The bearing 6 comprises an outer race 7 forced into the cylindrical portion 3c of the bearing case 3, an inner race 8 having a portion 8a in contact with the fly-wheel, a plurality of balls inserted between the outer race 7 and the inner race 8, a holder 10 for these balls, and seals 11a and 11b secured to the outer race. The inside diameter of the inner race is made somewhat larger than the corresponding outside diameter of the sleeve 1 so as to form a clearance of nearly the same dimensions as the aforementioned bearing case. A ring 12 for preventing slip-out of the bearing and for transmitting the thrust is interposed between the bearing 6 and the bearing case 3 with the outer peripheral portion of the ring forced into between the inward end of the outer race 7 and the radially extending portion 3b of the bearing case 3. The ring 12 is somewhat bent in a direction away from the inner race 8 so as not to make contact with the inner race 8, and the inward end of the ring is in engagement with a circumferential projected portion 1d formed as the shoulder of the circumferential groove 1c of the sleeve 3.

Behind the aforementioned cover 2, a reinforcing member 14 for reinforcing the cover and transmitting the thrust is secured to the sleeve 1 and to the cover 2, and two fork receiving portions 15 (only one of which is shown) are provided at two diametrical locations on the outer peripheries of the reinforcing member 14 and the sleeve 1.

With the above-described construction, there is some eccentricity between the rotational axis of the fly-wheel and the center line of the bearing so that, when centripetal force acts on the bearing 6 during the clutch release, the bearing means comprising the bearing 6, thrust transmission member 12 and bearing case 3 becomes centered while compressing the plastic deformation member 5 in the centripetal direction due to the presence of the above-mentioned clearance. By such centripetal force, the plastic deformation member 5 is permanently or plastically deformed to or nearly to the aligned or centered position either at one time or gradually, thus holding the bearing means at that position.

After the clutch release, if the plastic deformation member having visco-elasticity creeps slightly or if the aforementioned eccentricity is slightly present from the first and if the centripetal force does not act enough to plastically deform the plastic deformation member, then the bearing means will be aligned by the elastic action of the deformable member each time the clutch is used, whereby the deformable member will soon be plastically deformed to its aligned position.

Description has been made with respect to the device having a bearing of the rotatable inner race type in which the inner race is rotatable in contact with the clutch diaphragm, but the device of the rotatable outer race type is similar to what has been described above, with the exception that the plastic deformation member as described is disposed between the inner race which is the stationary race and the sleeve.

Tables 2 to 5 below show the result of the tests carried out under various conditions for the clutch release bearing device of the present invention as schematically illustrated in FIGS. 2 to 5.

In FIGS. 2 to 4, reference character 100 designates a sleeve, and 101 a bearing case secured to the sleeve 100. The bearing comprises an inner race 103 rotatable when in contact with a diaphragm spring 102, an outer race 104 which is the stationary race, and balls 105.

The bearing has a clearance with respect to the outer peripheral surface of the sleeve 100. The plastic deformation member 106 having visco-elasticity is forced into between the outer race 104 and the bearing case 101.

In the device of FIG. 5, each part of which is formed by press working, sleeve 1 of FIG. 1 is composed of two plates 200 and 201, the plate 200 of which is integrally formed with a bearing supporting cover 200a and the plate 201 is fixed at its portion 201a to the bearing supporting cover 200a. A member 300 for preventing a cylindrical portion 3c of a bearing case 3 from moving in the axial direction is supported to the sleeve plate 200.

TABLE 2

| Test NO. | Plastic deformation ring | Number of revolutions (rpm) | Load (kg) ON (sec) | Load (kg) OFF (sec) | Eccentricity (mm) | Atmosphere (°C.) | Clutch release frequency | Bearing used | Bearing temp. (°C.) | Self-centering performance | Remarks |
|---|---|---|---|---|---|---|---|---|---|---|---|
| 1 | A | 3000 | 120 normally loaded | | 0.6 | 80 | 10 | FIG.2 | 98 | Good | |
| 2 | B | 3000 | 120 4 | 0 8 | 0.6 | 80 | 300 | FIG.2 | 108 | Good | |
| 3 | B | 3000 | 120 4 | 0 8 | 0.6 | Room Temp. 22–38 | 750 | FIG.2 | 48–52 | Good | |
| 4 | C | 3000 | 120 4 | 0 8 | 0.6 | 23–35 | 525 | FIG.2 | 45 | Good | Oil was applied to the ring |
| 5 | A | 3000 | 120 4 | 0 8 | 0.6 | −35—−45 | 350 | FIG.2 | −10–23 | Good | |
| 6 | A | 3000 | 100 4 | 0 8 | 0.6 | 22–24 | 300 | FIG.3 | 30–32 | Good | |
| 7 | A | 2000 | 100 1 | 0 11 | 0.5 | 23–26 | 600 | FIG.4 | 36–38 | Good | |
| 8 | A | 1800 | 80 4 | 0 8 | 0.6 | 24–28 | 600 | FIG.3 | 30–35 | Good | |
| 9 | A | 1800 | 80 4 | 0 8 | 0.6 | 128 | 8700 | FIG.3 | 130 | Good | Life test |

Note:
In the Table above, the plastic deformation rings A, B, C and D correspond to samples A, B, C and D, respectively.

Actual tests were carried out with respect to test vehicles incorporating the FIG. 4 bearing means of the present invention and the conventional bearing means, respectively, with an amount of eccentricity 0.8 mm, to find that the conventional bearing means produced remarkable friction noise due to the eccentricity, whereas the bearing means of the present invention produced no such noise. When the bearing means of the invention was disassembled after the test, it was found that the visco-elastic material was permanently deformed and the bearing was centered.

Table 3 below shows the result of the tests carried out with chlorinated polyethylene employed as a second specific example with the embodiment of FIG. 1.

TABLE 3

| | 3000 rpm; atmosphere: room temperature; initial eccentricity: 0.7 mm; ON: 120Kg→5 sec., OFF: 0Kg→3.6 sec. | | | | |
|---|---|---|---|---|---|
| Test No. | Hardness of plastic deformation member (HS) | Bearing temperature | Test time | Clutch release frequency | Result of centering performance confirmation test Centered condition |
| 1 | 50 | 50° C. | 1hr. 20m. | 560 | no backlash; plastically deformed |
| 2 | " | 43 | 35m. | 244 | no backlash; plastically deformed |
| 3 | " | 45 | 30m. | 210 | plastically deformed about 0.4 mm; no backlash |
| 4 | 40 | 44 | 50m. | 349 | plastically deformed about 0.4 mm; no backlash |
| 5 | 50 | 43 | 15m. | 105 | plastically deformed 0.55 mm; no backlash |
| 6 | 50 | 90 | 40m. | 280 | plastically deformed 0.45 mm. |

Note:
For Tests Nos. 5 and 6, the initial eccentricity was 0.6 mm.

From Table 3, it will be appreciated that the plastic deformation member gradually becomes plastically deformed.

Table 4 below shows the result of centering performance confirmation test carried out in the same conditions as those of actual vehicle with use of the bearing means shown in FIG. 5.

TABLE 4

| | | Test conditions | | Result of centering performance confirmation test | | |
|---|---|---|---|---|---|---|
| | | Initial eccentricity: 0.6mm ON: 100 Kg 4 sec. | | | | |
| | Plastic | Atmosphere: room temperature OFF: 0 Kg 4 sec | | Plastic | Centering due to clearance between front cover | Amount centered |
| Test No. | deformation ring | Number of revolutions rpm | Clutch release frequency | deformation mm | and sleeve mm | (total) mm |
| 1 | Chlorinated polyethylene compound unvulcanized | 2000 | 25 | 0.51 | 0.13/2 = 0.065 | 0.575 |
| 2 | Chlorinated polyethylene compound unvulcanized | 3000 | " | " | 0.12/2 = 0.06 | 0.57 |
| 3 | Chlorinated polyethylene compound unvulcanized | 4000 | " | 0.52 | 0.13/2 = 0.065 | 0.585 |
| 4 | Chlorinated polyethylene compound unvulcanized | 5000 | " | 0.53 | 0.12/2 = 0.06 | 0.59 |

Table 5 below shows the conditions and results of endurance test of plastic deformation ring of the Table 4.

TABLE 5

| Test Conditions | Test Results |
|---|---|
| initial eccentricity: 0.6 mm atmosphere: 120° C. | plastic deformation 0.53 mm (centering due to clearance between front cover and sleeve: 0.06 mm) |
| number of revolutions: 4000 rpm load: 100 Kg on: 1 sec. | amount centered (total): 0.59 mm state of plastic deformation ring: good |

TABLE 5-continued

| Test Conditions | Test Results |
|---|---|
| >10 × 10⁵ cycle off: 1 sec. | acoustic deterioration and grease deterioration of bearing: slight amount of residual grease: very large abrasion of bearing and diaphragm spring: slight |

According to the present invention, irrespective of some eccentricity present between the rotational axis of the fly-wheel and the center line of the clutch release bearing, the plastic deformation member of visco-elasticity is deformed at one time or gradually to hold the bearing means at its aligned position. Even if a slight amount of eccentricity is produced before the subsequent clutch release because of the creep resulting from the visco-elastic property, the bearing is aligned by the elasticity of the plastic deformation member during each clutch release, and held at that position, thus accomplishing a complete alignment.

The creep preventing means provided between the bearing case and the sleeve prevents creep of the bearing and thus, the plastic deformation member is never abraded by the creep of the bearing.

Further, the use of the plastic deformation member of visco-elasticity for the purpose of self-centering prevents production of the noise which would otherwise result from vibration or friction, and also effectively absorbs the vibration occurring during the running of the vehicle or the vibration occurring near the clutch.

What I claim:

1. A clutch release device of the self-centering type comprising a clutch release bearing means for releasing a clutch, and bearing support means slidably mounted substantially coaxial with the rotational axis of the clutch for supporting and guiding said bearing means, said bearing means being formed for movement in a direction perpendicular to the rotational axis of the fly-wheel of said clutch, the improvement comprising:
    a plastic deformation member of visco-elasticity disposed between said bearing means and said bearing support means;

said plastic deformation member being deformed by the motion of said bearing means perpendicular to said rotational axis which results from a centripetal force acting on said bearing means during clutch release when there is an eccentricity between said rotational axis of said fly-wheel and the center line of said bearing means, thus permitting movement of said bearing means to its centered position, so that said plastic deformation member is plastically deformed into said centered position and holds said bearing means at that position.

2. A clutch release device according to claim 1, wherein said bearing means includes a stationary race, a race rotatable in contact with a clutch diaphragm, and a support member integrally holding said stationary race and supporting said plastic deformation member between itself and said bearing support means.

3. A clutch release device according to claim 2, wherein said stationary race is an outer race, said rotatable race is an inner race, and said plastic deformation member support member is a bearing case integrally holding said outer race.

4. A clutch release device according to claim 1, wherein said bearing support means comprises a sleeve, a cover secured to said sleeve and supporting said plastic deformation member betwen itself and said bearing means, and fork receiving portion for driving said sleeve.

5. A clutch release device according to claim 1, wherein said plastic deformation member is selected from the group consisting of synthetic resin polymers and synthetic rubbers which is readily plastically deformable and low in bridge density.

6. A clutch release device according to claim 5, wherein said plastic deformation member contains minute solid materials.

7. A clutch release device according to claim 5, wherein said synthetic rubber includes unvulcanized silicon raw rubber.

8. A clutch release device according to claim 5, wherein said synthetic resin polymer includes a chlorinated polyethylene compound.

9. A clutch release device according to claim 8, wherein said compound is an unvulcanized chlorinated polyethylene compound.

10. A clutch release device according to claim 1, wherein said plastic deformation member is selected from the group consisting of synthetic resin polymer and synthetic rubber which is readily plastically deformable and is in false bridged condition.

11. A clutch release device according to claim 10, wherein said plastic deformation member contains minute solid materials.

12. A clutch release device according to claim 1, wherein mutually engageable convexity and concavity are provided between said bearing means and said bearing support means to prevent creep of said bearing means.

13. A clutch release device according to claim 12, wherein said creep preventing means comprises a recess formed in said support member for supporting said plastic deformation member of said bearing support means and a projection formed on said bearing means for engagement with said recess.

14. A clutch release device according to claim 1, wherein said plastic deformation member is disposed between said bearing means and said bearing support means with respect to the axial direction.

15. A clutch release device of the self-centering type comprising a clutch release bearing means for releasing a clutch, the bearing means including a stationary race, a race rotatable in contact with a clutch diaphragm and a support member integrally holding said stationary race, and bearing support means slidably mounted substantially coaxial with the rotational axis of the clutch for supporting and guiding said bearing means, said bearing means being formed for movement in a direction perpendicular to the rotational axis of the fly-wheel of said clutch, the improvement comprising:

a plastic deformation member of visco-elasticity disposed between the support member of said bearing means and said bearing support means;

said plastic deformation member being deformed by the motion of said bearing means perpendicular to said rotational axis which results from a centripetal force acting on said bearing means during clutch release when there is an eccentricity between said rotational axis of said fly-wheel and the center line of said bearing means, thus permitting movement of said bearing means to its centered position, so that said plastic deformation member is plastically deformed into said centered position and holds said bearing means at that position.

16. A device according to claim 15, wherein the plastic deformation member is provided in the path of thrust from the bearing support means to the bearing means.

17. A device according to claim 15, wherein an annular chamber is formed between the support member and the bearing support means, said plastic deformation member is provided in said annular chamber.

18. A device according to claim 15, wherein said bearing support means includes an axially slidable sleeve and a first member integrally formed with the sleeve and a fork receiving member, said plastic deformation member being provided between said first member and said support member.

19. A device according to claim 15, further comprising means for preventing creep of the bearing means.

* * * * *